United States Patent [19]
Stotelmyer et al.

[11] Patent Number: 5,499,656
[45] Date of Patent: Mar. 19, 1996

[54] INTEGRATED STORAGE AND TRANSFER SYSTEM AND METHOD FOR SPACECRAFT PROPULSION SYSTEMS

[75] Inventors: L. Scott Stotelmyer, Manhattan Beach; Don K. Fulkerson, Valencia, both of Calif.

[73] Assignee: Hughes Aircraft Company, Los Angeles, Calif.

[21] Appl. No.: 173,736

[22] Filed: Dec. 23, 1993

[51] Int. Cl.$^6$ .................................................. F16K 24/00
[52] U.S. Cl. ........................................... 137/583; 137/382
[58] Field of Search ..................................... 137/583, 382

[56] References Cited

U.S. PATENT DOCUMENTS

| | | | |
|---|---|---|---|
| 4,609,169 | 9/1986 | Schweickert et al. | 244/169 |
| 4,898,030 | 2/1990 | Yeh | 73/290 |
| 4,976,398 | 12/1990 | Bruhn | 244/135 |
| 5,064,153 | 11/1991 | Gindre et al. | 244/172 |
| 5,092,170 | 3/1992 | Honstvet et al. | 73/295 |
| 5,188,714 | 2/1993 | Davidson et al. | 204/129.35 |

*Primary Examiner*—A. Michael Chambers
*Attorney, Agent, or Firm*—Elizabeth E. Leitereg; Terje Gudmestad; W. K. Denson-Low

[57] ABSTRACT

A system, a portable propellant loading tank and loading method for bipropellant spacecraft servicing to load propellant into a spacecraft. The spacecraft has a propellant storage tank with a propellant input and a vent output. The system comprises a portable propellant loading tank for storing and transferring propellant that is couplable to the propellant input of the propellant storage tank in the spacecraft. The propellant loading tank is a stainless steel tank that is electropolished on its interior surface. A portable weighing system having a plurality of load cells provides output signals indicative of the weight of the propellant loading tank. A load cell readout device is coupled to the portable weighing system for providing an output indicative of the weight of the propellant storage tank. A receiver tank is coupled to the vent output of the propellant storage tank in the spacecraft. A second weighing system having a plurality of load cells provides output signals indicative of the weight of the receiver tank. A second load cell readout device is coupled to the second weighing system for providing an output indicative of the weight of the receiver tank. A helium supply is provided and a pressure load panel is coupled between the helium supply and the propellant loading tank for providing pressure to transfer the propellant to the propellant storage tank in the spacecraft. One method of loading propellant into the spacecraft comprises storing and transferring propellant in a portable propellant loading tank, temperature conditioning and helium saturating the propellant in the propellant loading tank, transferring the loading tank to a launch site, coupling the loading tank to the propellant storage tank, and pressurizing the portable propellant loading tank to transfer the propellant to the propellant storage tank in the spacecraft.

5 Claims, 4 Drawing Sheets

INTEGRATED STORAGE AND TRANSFER SYSTEM AND METHOD FOR SPACECRAFT PROPULSION SYSTEMS

BACKGROUND

The present invention relates generally to propellant transferring systems for use with spacecraft propulsion systems, and more particularly, to an integrated storage and transfer system and method for storing and transferring propellant to a spacecraft for use by a spacecraft propulsion system.

The assignee of the present invention manufactures and launches spacecraft that use onboard thrusters to orient and reposition the spacecraft while it is in orbit to optimize its location and orientation. Two part propellent, or bipropellant as it is known, comprising fuel (hydrazine) and oxidizer ($N_2O_4$), is loaded into separate storage tanks on the spacecraft prior to launch. In operation, the two bipropellant liquid propellants are combined in a plenum under computer control to cause operation of selected thrusters to achieve proper spacecraft orientation.

In the past, an elaborate procedure has been used to obtain, transport and load the bipropellant liquid propellants into the spacecraft. This procedure is time consuming, costly, and poses many unnecessary environmental and safety risks. This procedure is described with reference to FIG. 1 of the drawings. More specifically, FIG. 1 shows a procedural flow diagram illustrating a conventional procedure (10) for acquiring, shipping, and loading bipropellant liquid propellants into a spacecraft. Suppliers of the hydrazine and oxidizer liquid propellants independently fill (11, 12), as required, enough fifty-five gallon drums of fuel and small oxidizer containers of the respective propellants to fill an order. The fifty-five gallon drums and small containers are used because of Department of Transportation requirements for transporting the highly toxic and hazardous bipropellant materials to the spacecraft launch site. The loaded fifty-five gallon drums of fuel and small containers of oxidizer along with fuel and oxidizer servicing carts are shipped (13) to the launch site.

At the launch site, the fuel cart and fifty-five gallon fuel drums are set up and prepared (14) for fuel transfer. Similarly, the oxidizer cart and the small oxidizer containers are set up and prepared (15) for oxidizer ($N_2O_4$) transfer. A molecular sieve is prepared 16 that is used during cart service to remove iron (Fe) from the $N_2O_4$ oxidizer. This has heretofore typically occurred during all propellant loading operations. Fuel is then transferred (17) from the fuel drums into a fuel service cart. Oxidizer is then transferred (18) from the small containers into an oxidizer service cart. These two steps are repeated to transfer the fuel and oxidizer from each require fuel and oxidizer container into the respective fuel and oxidizer service carts. After the fuel and oxidizer is fully transferred to the respective fuel and oxidizer service carts, each respective cart is sampled (19, 21) to determine if there is any contamination of either of the liquid propellants due to the transfer. Thereafter the propellants are conditioned 22 for a period of five days. This conditioning operation ensures that the temperature of the propellants are substantially the same as that of the spacecraft, and provides for helium saturation of the fuel and oxidizer. Thereafter, the respective fuel and oxidizer service carts are further pressurized (23) using helium to force the fuel or oxidizer out of its respective cart and into the respective storage tanks in the spacecraft. The loading equipment, molecular sieve and carts are then cleaned (24) per Department of Transportation requirements for hazardous materials shipment. The fuel and oxidizer drums are then cleaned (26)and returned to the respective supplier or disposed of, as the case may be. The oxidizer propellant container is returned (26) to the supplier for refill and reuse.

As should be clear from the above description, this procedure (10) is complicated and time-consuming creates environmental hazards, and potentially exposes support personnel to injury. The procedure takes approximately thirty-five days to complete for a typical spacecraft. This long time period and the required sampling has contributed greatly to the costs of loading propellant into the storage tanks in the spacecraft.

Accordingly, it is an objective of the present invention to provide for a system and method that improves upon this conventional procedure and provides a highly efficient, cost-effective and environmentally safe means for obtaining, transporting, and loading the constituent propellants into a spacecraft.

SUMMARY OF THE INVENTION

In order to meet the above and other objectives, improved ground support equipment (GSE) has been designed and built for bipropellant spacecraft servicing along with a new loading procedure to implement propellant loading into the spacecraft. More specifically, the present invention is a propellant loading system for use with a spacecraft comprising fuel and oxidizer propellant storage tanks that have respective propellant inputs and vent outputs. The system comprises portable fuel and oxidizer propellant loading tanks (containers) for storing and selectively transferring propellant to the respective fuel and oxidizer propellant storage tanks in the spacecraft. Each propellant loading container comprises a cylindrical stainless steel tank that is electropolished on its interior surface. A portable weighing system is provided that comprises a plurality of load cells for providing output signals indicative of the weight of the respective propellant loading tanks and propellant. A load cell readout device is coupled to the portable weighing system for providing an output indicative of the weight of the propellant loading tanks and propellant. Fuel and oxidizer receiver tanks are coupled to the vent output of each respective propellant tank in the spacecraft. A second weighing system is provided that comprises a plurality of load cells for providing output signals indicative of the weight of the respective receiver tanks. A second load cell readout device is coupled to the second weighing system for providing an output indicative of the weight of the receiver tanks. A supply of inert gas, such as helium or nitrogen, is provided and a pressure load panel is selectively coupled between the inert gas supply and the propellant loading tanks to provide pressure for forcing the liquid propellants out of the propellant loading tanks and into the propellant storage tanks in the spacecraft.

A method of loading propellant into a spacecraft comprises storing and transferring propellant in portable propellant loading tanks, which tanks also allow for gas absorption conditioining and temperature conditioning of the propellants. Temperature conditioning of the propellants is performed using the portable propellant loading tanks. By having the vendor/supplier perform post-load helium pressurization to the propellant loading tanks (temperature versus pressure), the post load equilibrium pressurization of the spacecraft storage tanks may be more precise, since accurate modeling of helium gas saturation in the liquid propellants is performed. This provides for a more accurate prediction of the pressure in the spacecraft storage tanks after loading so that storage tank pressures comply with applicable launch site and launch vehicle safety requirements. After coupling the propellant loading tanks to the respective storage tanks in the spacecraft and then selectively pressurizing the portable loading tanks, the propellant is transferred to the respective storage tanks in the spacecraft. The method may further comprise weighing the respective propellant loading tank (and propellant therein) during propellant transfer, venting the respective propellant tank in the spacecraft to a receiver tank, and weighing the respective receiver tank J (and propellant therein) during propellant transfer, wherein the amount of propellant transferred to the respective propellant storage tank in the spacecraft equals the difference between the measured weights.

The ground support equipment of the present invention allows spacecraft propellant loading at the required pressures at launch sites to occur while meeting all applicable launch site and spacecraft processing facility requirements. The bipropellant spacecraft loading operations are performed in the same way as on previous spacecraft manufactured by the assignee of the present invention, such as Intelsat, HS-393 and early HS-601 and HS-376W spacecraft. The spacecraft loading methodology does not change, but the ground support equipment does and the overall loading procedure is new and improved. The new ground support equipment is a portable system. The major difference between the present and prior systems is that the propellant loading tanks replace the 55 gallon drums and the smaller oxidizer containers, replace conventional fuel and oxidizer service modules and provide for advanced conditioning of the propellants. By eliminating the respective service modules the following operations have been eliminated, thus resulting in an improved propellant loading procedure. The operations that have been eliminated include fuel cart set up and servicing, fuel sampling, oxidizer cart and molecular sieve setup and servicing, oxidizer sampling, fuel cart deservicing, oxidizer cart and molecular sieve deservicing, drum decontamination clean up, hazardous material removal, elimination of Freon and isopropyl alcohol (except for spacecraft deservicing), and propellant thermal conditioning.

In the present invention, the molecular sieve is no longer required. The propellant loading containers are multi-functional, serving as propellant shipping containers and spacecraft servicing tanks. All of the propellant loading tanks are DOT (110A500W) approved and UN identified. All tanks are internally electropolished to prevent iron (Fe) from the container from being leached into solution in the $N_2O_4$ oxidizer. The tanks are designed to streamline launch base activities including shipping and sampling. Heretofore, propellant sampling was performed at the launch site after the fuel and oxidizer had been transferred from their respective shipping containers into the loading carts. This sampling procedure was required to validate that the loading carts and propellants were in compliance with specification limits. By eliminating propellant transfer into the loading carts at the launch site, sampling is not required at the launch site. Liquid propellant compliance to military specifications is verified by chemical analysis performed by the supplier after loading of the propellant loading tank and prior to shipment. Contingencies for launch site sampling must be maintained, however, to provide schedule insurance should a tank be damaged or develop a minor leak during transport. Helium saturation of the fuel and oxidizer begins at the time the supplier fills the propellant loading tanks and propellant thermal conditioning may begin as soon as the containers arrive at or near the launch site.

By implementing the above operations, launch activities are streamlined, launch processing costs are reduced by more than fifty percent. Total spacecraft propellant loading is reduced from 35 to 17 days, environmental concerns are addressed, and the highest standards of quality and safety are maintained.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4, comprising

DETAILED DESCRIPTION

Figure 2:
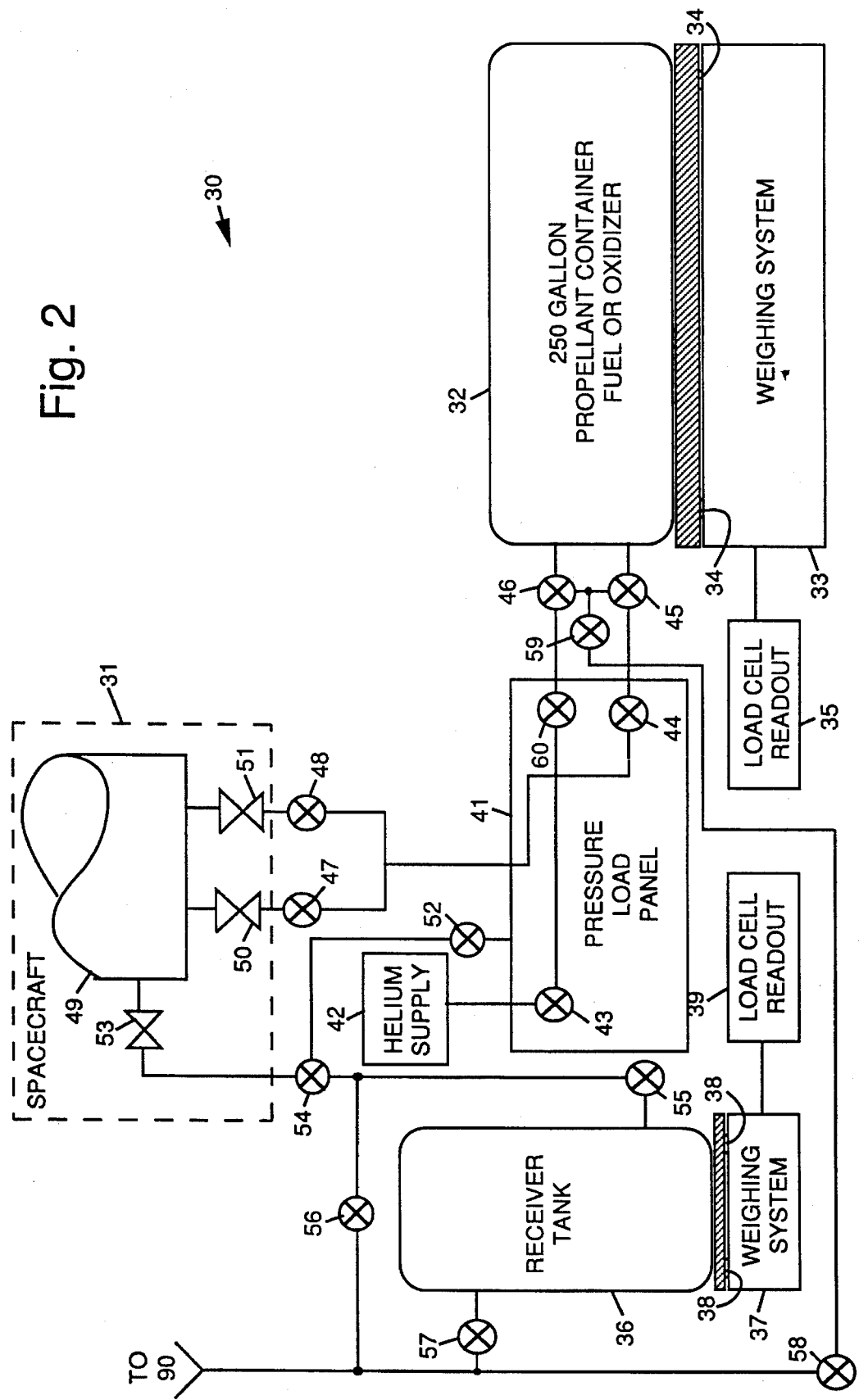
FIG. 2 illustrates a bipropellant loading system in accordance with the principles of the present invention.

Referring to the drawing figures, FIG. 2 illustrates a bipropellant loading system 30 in accordance with the principles of the present invention. The bipropellant loading system 30 is adapted to load bipropellant liquid propellants into a spacecraft 31. The bipropellant loading system 30 shown in FIG. 2 is illustrative of one half of the loading system 30, such as is used to load fuel, for example. A second substantially identical portion of the system 30 is provided for loading oxidizer. Only the most relevant components of the system 30 are shown and described with reference to FIG. 2.

The bipropellant loading system 30 is comprised of a plurality of portable fuel and oxidizer propellant loading tanks 32 (typically two 250 gallon tanks 32) that are used to transfer and store fuel and oxidizer. Each propellant loading tank 32 is disposed on a weighing system 33 that includes a plurality of load cells 34 that are adapted to provide output signals indicative of the weight of the propellant loading tank 32 disposed thereon. The output signals are coupled to a load cell readout device 35.

A receiver tank 36 is disposed on a second weighing system 37 that includes a plurality of load cells 38 that are adapted to provide output signals indicative of the weight of the receiver tank 36 disposed thereon. The output signals are coupled to a second load cell readout device 39. An pressure load panel 41 is coupled to an inert gas supply 42 (helium or nitrogen ) by way of a valve 43. The helium supply 42 provides pressure to the system 30 to transfer the fuel or oxidizer propellants to the spacecraft 31. The pressure load panel 41 is coupled to a pressure input of the propellant loading tank 32 by way of two valves 60, 46. An output of the propellant loading tank 32 is coupled by way of primary outlet valves 44, 45 to fuel or oxidizer valves 47, 48 that are coupled by way of respective valves 50, 51 to propellant (fuel or oxidizer) storage tanks 49 in the spacecraft 31.

A vent valve 53 is coupled to each of the propellant storage tanks 49 in the spacecraft 31 and provides an outlet path for fuel and oxidizer that boils-off or overflows during spacecraft loading to prevent vapor lock-up. This fuel and oxidizer boil-off or overflow is captured, weighed, and stored in the receiver tank 36. A plurality of valves 57, 54, 55, 56, 57, 58, 59 are provided to control the boil-off of fuel and oxidizer through the system 30 and to the receiver tank 36. The valves 59, 46, 45, 44, 47, 48, 50, 51, 52, 53, 54, 55, 56, 57, 58, 59, the pressure load panel 41, and the receiver tank 36 are conventional and this type of valve arrangement has been used in the past to transfer fuel and oxidizer liquid propellants to the spacecraft 31.

Figure 1:
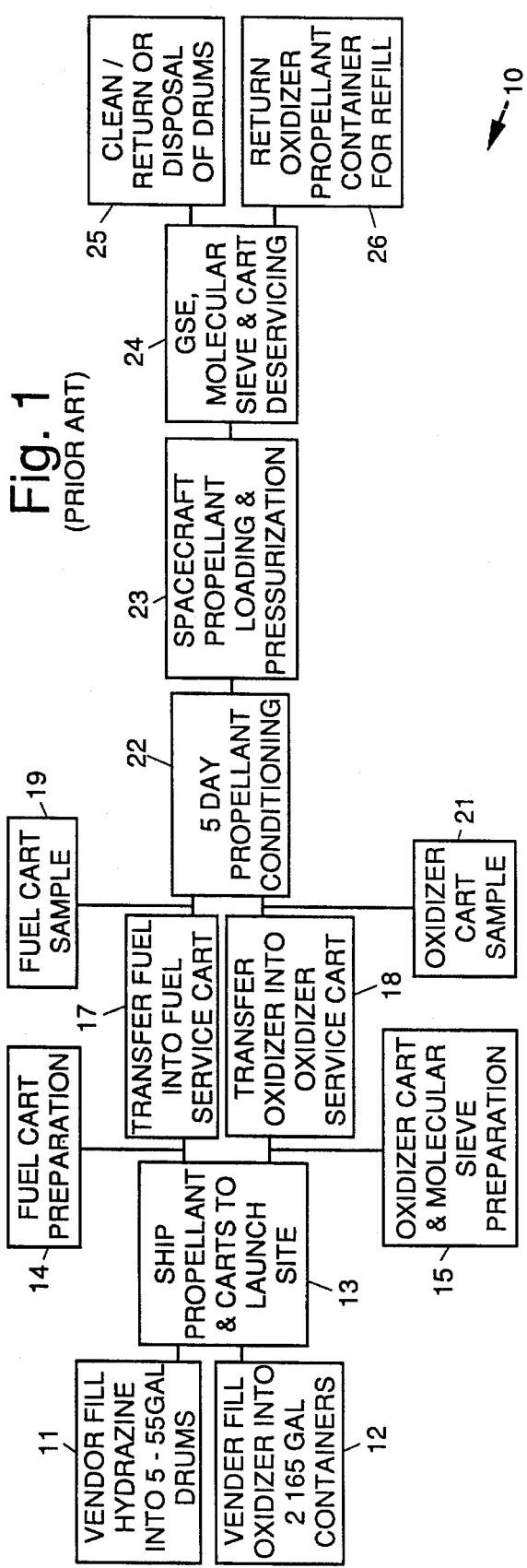
FIG. 1 illustrates a procedural flow diagram illustrating the conventional procedure for acquiring, shipping, and loading bipropellant liquid propellants into a spacecraft.
Figure 3:
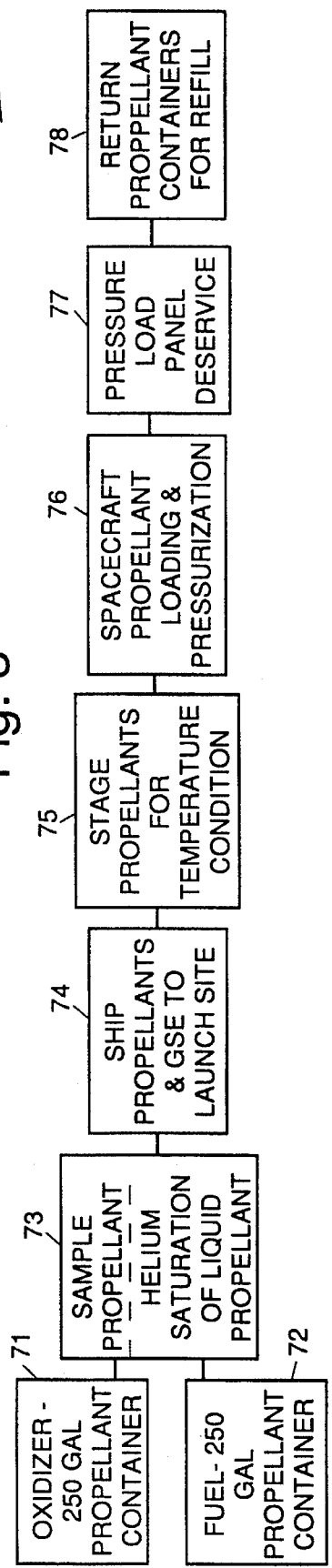
FIG. 3 illustrates a flow diagram illustrating a procedure for acquiring, shipping, and loading bipropellant liquid propellants into a spacecraft using the bipropellant loading system of FIG. 2.

FIG. 3 illustrates a flow diagram illustrating a procedure (70) for acquiring, shipping, and loading bipropellant liquid propellants into the spacecraft 31 using the bipropellant loading system 30 of FIG. 2. In the procedure (70) manufacturers and suppliers of the $N_2O_4$ oxidizer and monomethylhydrazine (MMH) fuel fill (71, 72) the respective propellant loading tanks 32 with fuel and oxidizer. The manufacturer or supplier then samples 73 the fuel and oxidizer in each loading tank 32 to verify that there is no other contaminants therein, and helium saturation of the liquid propellants is also accomplished. The manufacturer or supplier of $N_2O_4$ oxidizer verifies that the low iron content does not exceed the $N_2O_4$=$Mon^3$ (Fe) MIL Specification requirement and that there are no other contaminants therein. Each manufacturer or supplier certifies that the contents of the fuel and oxidizer loading tanks 32 meet military specifications prior to shipment.

Prior to spacecraft servicing, the certified liquid propellant loading tanks 32 are shipped or otherwise transferred (74) into the designated hazardous processing facility where the spacecraft 31 is to be loaded and staged for temperature conditioning (75) for a period of five days. The temperature conditioning (75) ensures that the temperature of the propellant is substantially the same as that of the spacecraft 31, and provides for final checking and adjustment of helium saturation of the fuel and oxidizer. The respective fuel and oxidizer propellant loading tanks 32 may be further pressurized (76) with helium so that the fuel or oxidizer is forced out of the portable loading tank and into the respective storage tanks 49 on the spacecraft 31. After the spacecraft tanks are loaded, the pressure load panel 41 is purge dry cleaned or deserviced (77) with gaseous nitrogen. The propellant loading tanks 32 are then returned (78) to the respective manufacturer or supplier for refill and reuse.

Figure 4C:
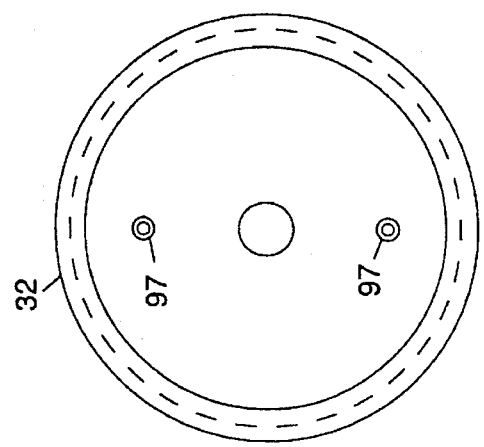
FIGS. 4a–4c, illustrate three views of the propellant tank used in the bipropellant loading system of FIG. 2.
Figure 4A:
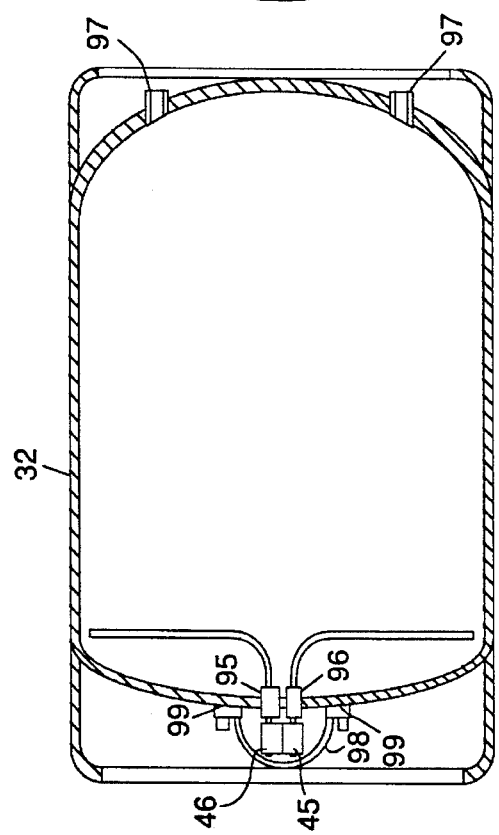
Figure 4B:
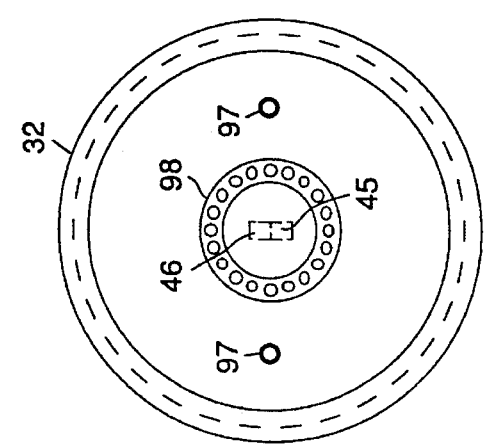

FIG. 4, comprising FIGS. 4a–4c, illustrate cutaway side and respective end views of the propellant loading tank 32 used in the bipropellant loading system 30 of FIG. 2. The propellant loading tank 32 is a 304L stainless steel tank that is electropolished on its interior surface. The loading tank 32 has an input fitting 95 that is coupled to the pressure load panel 41 by way of the valves 44, 45, and an output fitting 96 that is coupled to the spacecraft 31 by way of specific ones of the valves 46, 47, 48, depending upon whether the loading tank 32 is used for fuel or oxidizer. The loading tank 32 includes a number of inspection ports 97 and a tank bonnet 98 to protect the input and output valves 45, 46 during transit, and a sealing gasket 99 to provide a secondary seal. The loading tank 32 may have a length of about 102 inches and a diameter of about 30 inches with a wall thickness of about ½ to ⅝ inches, for example. The loading tank 32 is made to withstand a pressure of about 500 psig.

The tank 32 is generally constructed in a conventional manner, but is made from 304L stainless steel which requires different welding and other processes than carbon steel and has the electropolished interior surface, making it different from conventional fuel and oxidizer tanks.

Figure 5:
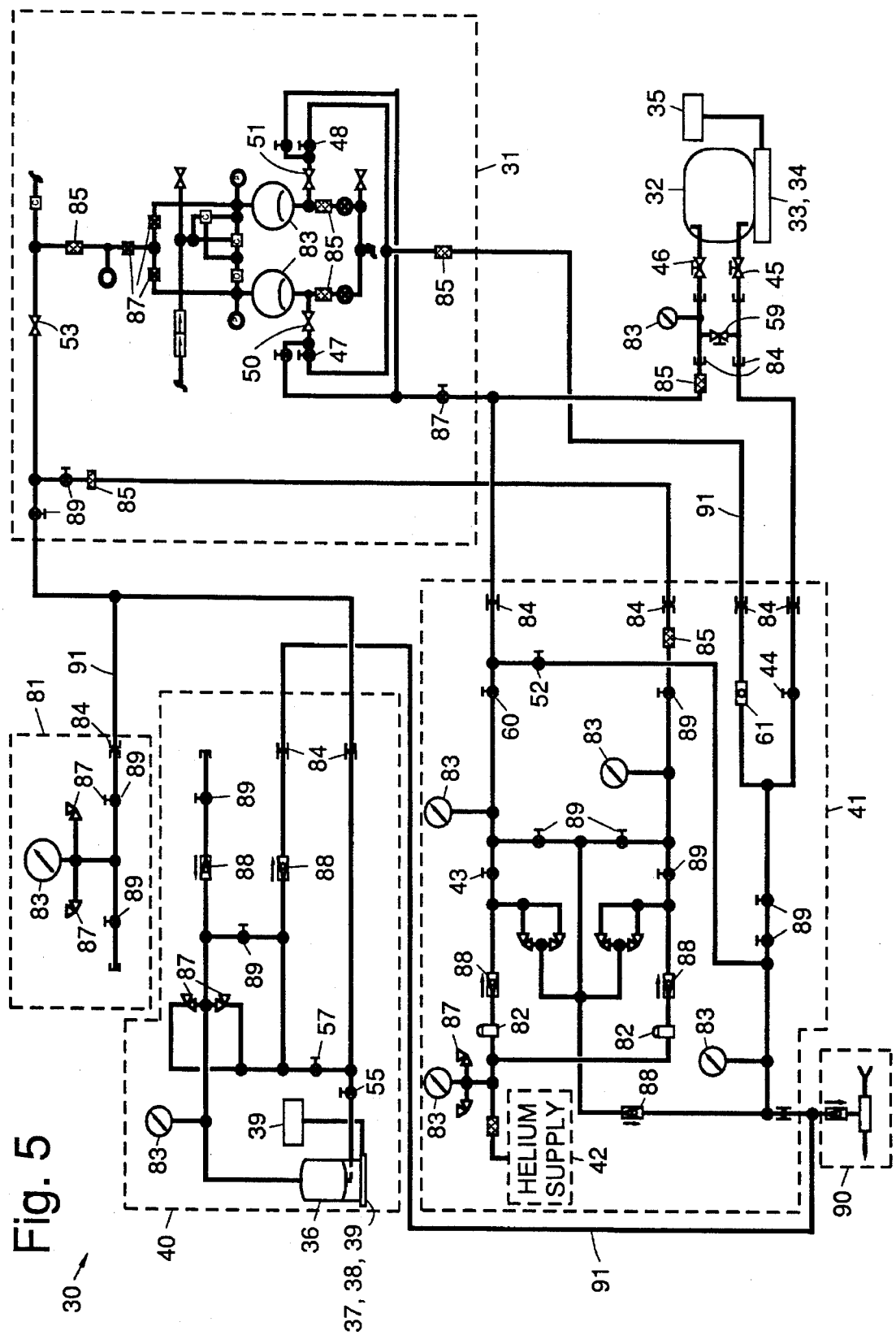
FIG. 5 shows a detailed schematic of a bipropellant loading system adapted for loading fuel or oxidizer.

FIG. 5 shows a detailed schematic of the bipropellant loading system 30 which may be used to load fuel or oxidizer. In addition to the elements described with reference to FIG. 2 above, additional components are shown in FIG. 5 such as regulators 82, gages 83, couplings 84, filters 85, relief valves 87, check valves 88, control valves 89, an aspirator 90, a sight glass 61, and stainless steel tubing 91. The "plumbing" of the system 30 is considered routine in the art and will not be described in detail. It is believed that those skilled in the art are readily capable of interconnecting the loading tanks 32, receiving tanks 36, and storage tanks 49. The bipropellant loading system 30 includes propellant monitoring device 81, a receiving system 40 comprising the receiving tank 36 and associated weighing system 37, 38, 39, a pressure load panel 41 used to control the transfer of propellant, the propellant loading tank 32 and weighing system 33, and the spacecraft 31.

An operational summary describing the use of the present invention follows. The following operations occur during bipropellant loading operations for an HS 601 spacecraft 31 in concurrence with approved spacecraft servicing procedures. The propellant loading tanks 32 are staged in a launch site fueling facility to provide for 5 day (120 hour) temperature conditioning. The weighing system 33 is positioned in the fueling room. A preload calibration and functional checkout of the weighing system 33 is performed. The pressure load panel 41, low pressure monitoring device 81, receiver tanks 36 and the bipropellant loading system 30 are set up in an area adjacent the weighing system 33 and spacecraft 31.

The oxidizer propellant loading tank 32 is placed on the weighing system 33. After all line hook-ups are made, an overall leak check is performed. Fuel and oxidizer are then separately transferred to the storage tanks 49 in the spacecraft 31. After the storage tanks 49 have been loaded with fuel/oxidizer, the propulsion loading system 30 is pressurized to a designated flight pressure. Following the above operations the spacecraft fill and drain valves are closed and secured. The propellant loading lines to the spacecraft 31 are aspirated, vented, disconnected and capped. The remaining residuals are pressure drained into their respective receiver tanks 36. The valves on the respective tanks 32, 36 are closed, capped, secured and staged for return shipment. The above operations are repeated for loading fuel into the spacecraft 31 using the fuel propellant loading tank 32. The bipropellant loading system 30 is deserviced using a gaseous nitrogen purge. This eliminates the use of Freon and other cleaning solvents that create hazardous wastes. After the deservicing operation, the equipment is secured and packaged for return shipment.

The portable propellant loading tanks 32 serve as a propellant shipping container that is DOT approved and UN identified and support propellant loading of the spacecraft 31. The propellant loading tanks 32 are internally electropolished. The electropolishing prevents the stainless steel from releasing iron (Fe) into solution in the $N_2O_4$ oxidixer.

The portable weighing system 33 is a mechanical scale that supports the propellant loading tanks 32 and measures propellant offload during loading of the spacecraft 31. This allows the proper fill fraction by weight or mass to be provided and verified. The weighing system 33 is constructed of stainless steel with four hydraulic load cells 34. The electronic readout 35 includes explosion-proof switches and is encased in explosion-proof hardware meeting all HAZMAT regulations.

The pressure/loading panel 41 is designed to act as a dual system. The first system assists in transferring propellant from the propellant loading tanks 32 into the storage tanks 49 in the spacecraft 31. The second system supports postload pressurization of the spacecraft 31. The pressure loading panel 41 allows an operator to have easy access to the spacecraft liquid fill control valves and greater visibility for pressure monitoring during propellant transfer and post load pressurization of the spacecraft 31.

The receiver tanks 36 are the same as have been used in previous loading operations. The receiver tanks 36 are used to receive fuel and oxidizer overflow and onload boil off. Each receiver tank 36 comprises a 50 gallon stainless steel tank designed to the ASME pressure vessel code with a 4:1 safety factor, having a maximum operating pressure of 100 psig. During spacecraft propellant transfer operations, the receiver tanks 36 is placed on the second weighing system 37. The receiver tanks 36 is tared out so the propellant residuals are precisely measured. The second weighing system 37 is constructed of stainless steel with four hydraulic load cells 38 and an electronic readout device 39. The electronic readout device 39 is encapsulated in an explosion-proof enclosure that meets all HAZMAT launch and safety requirements. The receiver tanks 36 contain no mechanical pumps and operate with external pressure sources.

Two small hand portable low pressure monitoring devices 81, identified and dedicated to either fuel or oxidizer service, are used to monitor the initial pressure and transfer of propellant into the spacecraft 31 and to prevent damage to propellant measuring devices that are internal to each propellant storage tank 49 in the spacecraft 31. Each device 81 contains a pressure gauge 83 (0–12 psig), redundant relief valves 87, two hand control valves 89, and associated tubing 91.

Thus there has been described a new and improved integrated storage and transfer system and method for storing and transferring propellant to a spacecraft for use by a spacecraft propulsion system. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A container for storing, transporting and transferring propellants to a spacecraft propellant tank of a satellite propulsion system during launch preparation operations, wherein said container is comprised of stainless steel having an interior surface and an exterior surface, and wherein said interior surface is electropolished, and wherein said container further comprises a first valve that is couplable to an inlet of said spacecraft propellant tank of said satellite propulsion system during said launch preparation operations for loading propellant into said container and for transferring propellant out of said container and into said spacecraft propellant tank of said satellite propulsion system during said launch preparation operations, and a second valve that is couplable to an inert gas supply and that comprises a pressure input for supplying pressurized inert gas to said container during said launch preparation operations, which inert gas provides pressure to transfer propellant from said container into said spacecraft propellant tank by way of said first valve.

2. The container of claim 1 further comprising a protective bonnet that covers and protects the first and second valves, and a gasket located between the bonnet and the exterior surface of said container, and wherein said gasket provide a secondary seal.

3. The container of claim 1, said container having a generally cylindrical portion and having two outwardly convex end portions.

4. The container of claim 3 wherein said first valve and said second valve are centrally located in one of said end portions.

5. The container of claim 4 further comprising a protective bonnet that covers and protects the first and second valves, a gasket located between the bonnet and the exterior surface of said container, and wherein said gasket provides a secondary seal.

\* \* \* \* \*